US012763087B2

(12) United States Patent
Zermini

(10) Patent No.: US 12,763,087 B2
(45) Date of Patent: Oct. 13, 2026

(54) METHOD FOR TRANSFORMING AUDIO INPUT DATA INTO AUDIO OUTPUT DATA AND A HEARING DEVICE THEREOF

(71) Applicant: GN Audio A/S, Ballerup (DK)

(72) Inventor: Alfredo Zermini, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 349 days.

(21) Appl. No.: 18/345,463

(22) Filed: Jun. 30, 2023

(65) Prior Publication Data

US 2024/0005938 A1 Jan. 4, 2024

(30) Foreign Application Priority Data

Jul. 1, 2022 (EP) .................................... 22182509

(51) Int. Cl.
*G10L 21/0208* (2013.01)
*G10L 25/30* (2013.01)
*G10L 25/84* (2013.01)

(52) U.S. Cl.
CPC .......... *G10L 21/0208* (2013.01); *G10L 25/30* (2013.01); *G10L 25/84* (2013.01)

(58) Field of Classification Search
CPC ..... G10L 21/0208; G10L 25/30; G10L 25/84; G10L 21/028; G10L 21/02; G10L 21/0272; G10L 17/04
See application file for complete search history.

(56) References Cited

U.S. PATENT DOCUMENTS

2017/0162194 A1 6/2017 Nesta et al.
2019/0318755 A1 10/2019 Tashev et al.
2020/0184987 A1* 6/2020 Kupryjanow ........... G10L 15/16
2022/0159403 A1* 5/2022 Sporer .................... H04S 7/302
(Continued)

FOREIGN PATENT DOCUMENTS

CN 109121057 A * 1/2019 ............. H04R 25/50
CN 109817236 A * 5/2019
CN 109121057 B 11/2020
(Continued)

OTHER PUBLICATIONS

Y.-H. Tu, J. Du and C.-H. Lee, "Speech Enhancement Based on Teacher-Student Deep Learning Using Improved Speech Presence Probability for Noise-Robust Speech Recognition," in IEEE/ACM Transactions on Audio, Speech, and Language Processing, vol. 27, No. 12, pp. 2080-2091, Dec. 2019, (Year: 2019).*
(Continued)

*Primary Examiner* — Bhavesh M Mehta
*Assistant Examiner* — Jangwoen Lee
(74) *Attorney, Agent, or Firm* — HSML P.C.

(57) ABSTRACT

A computer-implemented method for transforming audio input data into audio output data is provided. The method comprises receiving audio input data, providing background sound data by separating speech components from the audio input data by using a speech removal module, determining acoustic scene data, linked to an acoustic scene matching the background sound data, by using an acoustic scene classifier module, selecting a specialized noise reduction module based on the acoustic scene data, and processing the audio input data by using the specialized noise reduction module such that the audio output data is generated.

13 Claims, 2 Drawing Sheets

(56) References Cited

U.S. PATENT DOCUMENTS

| | | | | |
|---|---|---|---|---|
| 2023/0276182 A1* | 8/2023 | Zhang | H04R 25/558 381/315 | |

FOREIGN PATENT DOCUMENTS

| | | | |
|---|---|---|---|
| CN | 113380262 A * | 9/2021 | G06N 3/045 |
| CN | 114095617 A | 2/2022 | |

OTHER PUBLICATIONS

Morten Kolbæk "Single-Microphone Speech Enhancement and Separation Using Deep Learning", arXiv:1808.10620, last revised Dec. 4, 2018.

Kong et al., "PANNs: Large-Scale Pretrained Audio Neural Networks for Audio Pattern Recognition", arXiv:1912.10211, last revised Aug. 23, 2020.

Mesaros et al., "A multi-device dataset for urban acoustic scene classification", arXiv:1807.09840, last revised Oct. 11, 2018.

The extended European search report issued in European Application No. 22182509.4, dated Nov. 18, 2022.

Office Action issued in Chinese Application No. 202310800171.1, mailed Sep. 26, 2025, with English translation.

* cited by examiner

METHOD FOR TRANSFORMING AUDIO INPUT DATA INTO AUDIO OUTPUT DATA AND A HEARING DEVICE THEREOF

FIELD

The present invention relates to hearing devices and methods for processing audio data. More specifically, the disclosure relates to a method for improving speech intelligibility, and a hearing device thereof.

BACKGROUND

In many of the speakers, headphones and other sound-reproducing devices of today, audio data processing algorithms are being used for reducing noise and other unwanted sound signals. For conference speakers and other devices in which speech is to be reproduced, different measures can be made to reduce the impact of sound signals identified not to be speech. For instance, sound signal components having characteristic frequencies that are not within the range of speech can be identified as noise. Other factors to take into account for identifying noise is frequency patterns or recurrence. Once being identified as noise, these components can be removed, or at least reduced, from the audio data before this is transformed into sounds signals by the conference speaker. By using this approach, audio data originating from a person speaking into a microphone while sitting on a train may be processed such that the speech components can be distinguished from train sound components. As a next step, the train sound components can be removed with the positive effect that a person listening to the conference speaker will be less or not at all bothered by the noisy train environment.

Common ways to improve speech intelligibility today is to use so-called voice detectors. In short, by knowing when the audio data comprise speech components and when it does not, different types of audio data processing may be used. For instance, in case it is detected that there is speech present, sound signals within the frequency range linked to speech may be amplified to provide for that the speech is emphasized.

A more recent approach to improve speech intelligibility is to use so-called acoustic scene classification. In short, instead of detecting whether speech is present or not, as is the general principle when using the voice detector, the audio data is analyzed and linked to one of a number of acoustic scenes. For instance, continuing the example above, by analyzing the audio data generated by the person speaking while sitting on the train, an acoustic scene classification system may come to the conclusion that the acoustic scene linked to this audio data is "train" or similar. When knowing the acoustic scene, an algorithm made for improving speech intelligibility can be provided with this input with the result that a more precise audio data processing can be made.

Even though, audio data processing has been improved significantly over the last decades, there is still a need to further provide methods and devices that can provide for that speech originating from a noisy environment can be clearly presented to a user at a receiving end.

SUMMARY

According to a first aspect, it is provided a computer-implemented method for transforming audio input data into audio output data, said method comprising receiving audio input data, providing background sound data by separating speech components from the audio input data by using a speech removal module, determining acoustic scene data, linked to an acoustic scene (AS) matching the background sound data, by using an acoustic scene classifier (ASC) module, selecting a specialized noise reduction (S-NR) module based on the acoustic scene data, and processing the audio input data by using the specialized noise reduction (S-NR) module such that the audio output data is generated.

An advantage with this method is that by using the background sound data in isolation it is made possible to accurately determine the acoustic scene linked to the background sound data. Once having the acoustic scene determined, the S-NR module being specifically configured for this acoustic scene can be selected. As an effect of this, it is made possible to increase the speech intelligibility. A further advantage with this method is that by separating speech components, the speech components will not negatively influence the determination of the acoustic scene data.

The S-NR module may be a neural network, and the specialized noise reduction (S-NR) module may be selected among a fixed set of pre-trained neural networks, each addressing a sound environment with specific characteristics.

By having the fixed set of pre-trained S-NR modules, it is made possible to train these with data from various locations. By having access to a large amount of data, more reliable S-NR modules can be achieved.

The S-NR modules may be neural networks, e.g. convolutional neural networks, but it is also possible to use other approaches for the S-NR modules. For instance, the S-NR modules may be statistical models. The S-NR modules may be pre-trained machine learning models.

The fixed set of specialized noise reduction (S-NR) modules may comprise at least three modules, said at least three modules comprising one modules addressing a transportation environment, one module addressing an outdoor environment and one module addressing an indoor environment.

It has been found that the different acoustic scenes can be divided into three groups; transportation environment, including e.g. bus transport, train transport and tram transport, outdoor environment, including e.g. park, street, and market place, and indoor environment, including e.g. café, shopping mall, restaurant and airport. By having these three modules, a hand over from one of the environments to another can be reliably identified.

The step of receiving the audio input data may be performed at a receiver (RX) device, and the audio input data may be transmitted from a transmitter (TX) device, and the method may further comprise receiving, at the RX device, a Time-Frequency (T-F) mask from the TX device, providing the T-F mask to the speech removal device arranged in the RX device such that background sound data is generated by combining the audio input data with the T-F mask.

The T-F mask has been found to be advantageous to use to remove the speech components from the audio input data such that background sound data is obtained. Thus, instead of using the T-F mask for removing the background sound data from the audio input data such that the speech components remain, which is the common way of using the T-F mask, it has been found that the T-F mask could be used in an opposite manner and instead remove the speech components.

The step of providing the background sound data may be performed by multiplying the audio input data with the Time-Frequency (T-F) mask.

An advantage with multiplying, e.g. element-wise multiplying, is that the background sound data can be obtained in an efficient way from a computational power perspective.

The audio input data and the time-frequency (T-F) mask may be received in parallel by the RX device.

By having the T-F mask determined in the TX device, this can be transferred in parallel with the audio input data to the RX device. Once received in the RX device, the T-F mask can be combined with the audio input data, e.g. by using multiplication. With this approach, less computational power is required in the RX device, which may be beneficial if receiving audio input data from multiple TX devices.

Each of the S-NR modules may be more complex than a receiver side generic noise reduction (RX G-NR) module, configured to identify the T-F mask based on the audio input data, such that computational power associated with each of S-NR modules is greater than computational power associated with the RX G-NR module.

By having the RX G-NR module being less computationally complex than the S-NR modules, a better overall performance can be achieved. Since the purpose of the RX G-NR module is to identify the most appropriate S-NR module (via the background sound data and the acoustic scene), it has found beneficial, in particular when only having a few, e.g. less than ten different S-NR modules, to assign more computational power to the S-NR modules than to the RX G-NR module. It is also possible to have the TX G-NR module being less computationally complex than the S-NR modules.

The RX G-NR module and a T-F mask detector may be arranged in the RX device, and the method may further comprise

- determining if the T-F mask is received from the TX device,
- in case the T-F mask is received by the RX device, deactivate the RX G-NR module, or
- in case the T-F mask is not received by the RX device, activate the RX G-NR module such that the T-F mask is provided by the RX G-NR module.

By having the RX device arranged in this way it is possible for the RX device both to communicate with TX devices configured to transfer the audio input data and the T-F mask, or other type of side information, as well as with TX devices only transferring the audio input data. In the latter case, the RX device will provide the T-F mask itself. Having this flexibility improves the versatility of the RX device.

The method may further comprise

- identifying the T-F mask by using the RX G-NR module on the audio input data, and
- providing the T-F mask to the speech removal module such that background sound data is generated by combining the audio input data with the T-F mask.

The method may further comprise

- receiving position data,
- wherein the step of selecting the S-NR module is based on the acoustic scene data in combination with the position data.

By including the position data, a more accurate choice of the acoustic scene can be achieved. For instance, in case the position data suggests that the TX device is moving above a speed threshold and also that the position data coincides with known train track positions, the position data indicates that the acoustic scene may be the transport environment. In contrast, in case the position data indicates that the TX device is not moving, the transport environment is less likely.

According to a second aspect it is provided a hearing device, such as a conference speaker, comprising

- a receiver (RX) device arranged to receive audio input data from a transmitter device (TX),
- said RX device further comprises
- a speech removal module configured to provide background sound data by separating speech components from the audio input data,
- an acoustic scene classifier (ASC) module configured to determine acoustic scene data, linked to an acoustic scene (AS) matching the background sound data,
- a specialized noise reduction (S-NR) selector configured to select a specialized noise reduction (S-NR) module based on the acoustic scene data, and
- a processing module configured to process the audio input data by using the specialized noise reduction (S-NR) module such that audio output data is generated.

The same advantages and features above with respect to the first aspect also apply to this second aspect.

The RX device may further comprise

- a T-F mask receiver configured to receive a T-F mask from the TX device,
- wherein the speech removal module may be configured to remove the speech components from the audio input data by combining the audio input data and the T-F mask.

The RX device may further comprise

- a receiver generic noise reduction (RX G-NR) module configured to provide the T-F mask based on the audio input data, and
- a T-F mask detector configured to identify whether or not the T-F mask is provided from the TX device, and in case the T-F mask is provided by the TX device, deactivate the RX G-NR module, or in case the T-F mask is not provided by the TX device, activate the RX G-NR module such that the T-F mask is provided by the RX G-NR module.

The RX device may further comprise

- a receiver generic noise reduction (RX G-NR) module configured to provide the T-F mask based on the audio input data, and to provide the T-F mask to the speech removal module such that background sound data is generated by combining the audio input data with the T-F mask.

The RX device may further comprise

- a position data receiver configured to receive position data from the TX device,
- wherein the S-NR selector is configured to select the S-NR module based on the acoustic scene data in combination with the position data.

The term hearing device used herein should be construed broadly to cover any device configured to receive audio input data, i.e. audio data comprising speech, and to process this data. By way of example, the hearing device may be a conference speaker, that is, a speaker placed on a table or similar for producing sound for one or several users around the table. The conference speaker may comprise a receiver device for receiving the audio input data, one or several processors and one or several memories configured to process the audio input data into audio output data, that is, audio data in which speech intelligibility has been improved compared to the received audio input data.

The hearing device may be configured to receive the audio input data via a data communications module. For instance, the device may be a speaker phone configured to receive the audio input data via the data communications module from an external device, e.g. a mobile phone communicatively connected via the data communications module of the hearing device. The device may also be provided with a microphone arranged for transforming incoming sound into the audio input data.

The hearing device can also be a hearing aid, i.e. one or two pieces worn by a user in one or two ears. As is commonly known, the hearing aid piece(s) may be provided with one or several microphones, processors and memories for processing the data received by the microphone(s), and one or several transducers provided for producing sound waves to the user of the hearing aid. In case of having two hearing aid pieces, these may be configured to communicate with each other such that the hearing experience could be improved. The hearing aid may also be configured to communicate with an external device, such as a mobile phone, and the audio input data may in such case be captured by the mobile phone and transferred to the hearing device. The mobile phone may also in itself constitute the hearing device.

The hearing aid should not be understood in this context as a device solely used by persons with hearing disabilities, but instead as a device used by anyone interested in perceiving speech more clear, i.e. improving speech intelligibility. The hearing device may, when not being used for providing the audio output data, be used for music listening or similar. Put differently, the hearing device may be earbuds, a headset or other similar pieces of equipment that are configured so that when receiving the audio input data this can be transformed into the audio output data as described herein.

The hearing device may also form part of a device not solely used for listening purposes. For instance, the hearing device may be a pair of smart glasses. In addition to transforming the audio input data into the audio output data as described herein and providing the resulting sound via e.g. spectacles sidepieces of the smart glasses, these glasses may also present visual information to the user by using the lenses as a head up-display.

The hearing device may also be a sound bar or other speaker used for listening to music or being connected to a TV or a display for providing sound linked to the content displayed on the TV or display. The transformation of incoming audio input data into the audio output data, as described herein, may take place both when the audio input data is provided in isolation, but also when the audio input data is provided together with visual data.

The hearing device may be configured to be worn by a user. The hearing device may be arranged at the user's ear, on the user's ear, over the user's ear, in the user's ear, in the user's ear canal, behind the user's ear and/or in the user's concha, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The hearing device may be a hearable such as a headset, headphone, earphone, earbud, hearing aid, a personal sound amplification product (PSAP), an over-the-counter (OTC) hearing device, a hearing protection device, a one-size-fits-all hearing device, a custom hearing device or another head-wearable hearing device. The hearing device may be a speaker phone or a sound bar. Hearing devices can include both prescription devices and non-prescription devices.

The hearing device may be embodied in various housing styles or form factors. Some of these form factors are earbuds, on the ear headphones or over the ear headphones. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

The hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

The hearing device may comprise one or more antenna(s) configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

The hearing device may comprise one or more wireless communication unit(s). The one or more wireless communication unit(s) may comprise one or more wireless receiver (s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g. enabling the user to listen to media, such as music or radio and/or enabling the user to perform phone calls.

The wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another hearing device, e.g., as part of a binaural hearing system and/or from one or more accessory device(s), such as a smartphone and/or a smart watch.

The hearing device may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

The hearing device may comprise an output transducer. The output transducer may be coupled to the processing unit. The output transducer may be a loudspeaker. The output transducer may be configured for converting the first electric output signal into an acoustic output signal. The output transducer may be coupled to the processing unit via the magnetic antenna.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

The hearing device may comprise a digital-to-analogue converter configured to convert the first electric output signal, the second electric output signal and/or the wireless output signal into an analogue signal.

The hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

The hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The hearing device may comprise a memory, including volatile and non-volatile forms of memory.

The hearing device may comprise one or more antennas for radio frequency communication. The one or more antenna may be configured for operation in ISM frequency band. One of the one or more antennas may be an electric antenna. One or the one or more antennas may be a magnetic induction coil antenna. Magnetic induction, or near-field magnetic induction (NFMI), typically provides communication, including transmission of voice, audio and data, in a range of frequencies between 2 MHz and 15 MHz. At these frequencies the electromagnetic radiation propagates through and around the human head and body without significant losses in the tissue.

The magnetic induction coil may be configured to operate at a frequency below 100 MHz, such as at below 30 MHz, such as below 15 MHz, during use. The magnetic induction coil may be configured to operate at a frequency range between 1 MHz and 100 MHz, such as between 1 MHz and 15 MHz, such as between 1 MHz and 30 MHz, such as between 5 MHz and 30 MHz, such as between 5 MHz and 15 MHz, such as between 10 MHz and 11 MHz, such as between 10.2 MHz and 11 MHz. The frequency may further include a range from 2 MHz to 30 MHz, such as from 2 MHz to 10 MHz, such as from 2 MHz to 10 MHz, such as from 5 MHz to 10 MHz, such as from 5 MHz to 7 MHz.

The electric antenna may be configured for operation at a frequency of at least 400 MHz, such as of at least 800 MHz, such as of at least 1 GHz, such as at a frequency between 1.5 GHz and 6 GHz, such as at a frequency between 1.5 GHz and 3 GHz such as at a frequency of 2.4 GHz. The antenna may be optimized for operation at a frequency of between 400 MHz and 6 GHz, such as between 400 MHz and 1 GHz, between 800 MHz and 1 GHz, between 800 MHz and 6 GHz, between 800 MHz and 3 GHz, etc. Thus, the electric antenna may be configured for operation in ISM frequency band. The electric antenna may be any antenna capable of operating at these frequencies, and the electric antenna may be a resonant antenna, such as monopole antenna, such as a dipole antenna, etc. The resonant antenna may have a length of $\lambda/4\pm10\%$ or any multiple thereof, $\lambda$ being the wavelength corresponding to the emitted electromagnetic field.

The present invention relates to different aspects including the hearing device and the system described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
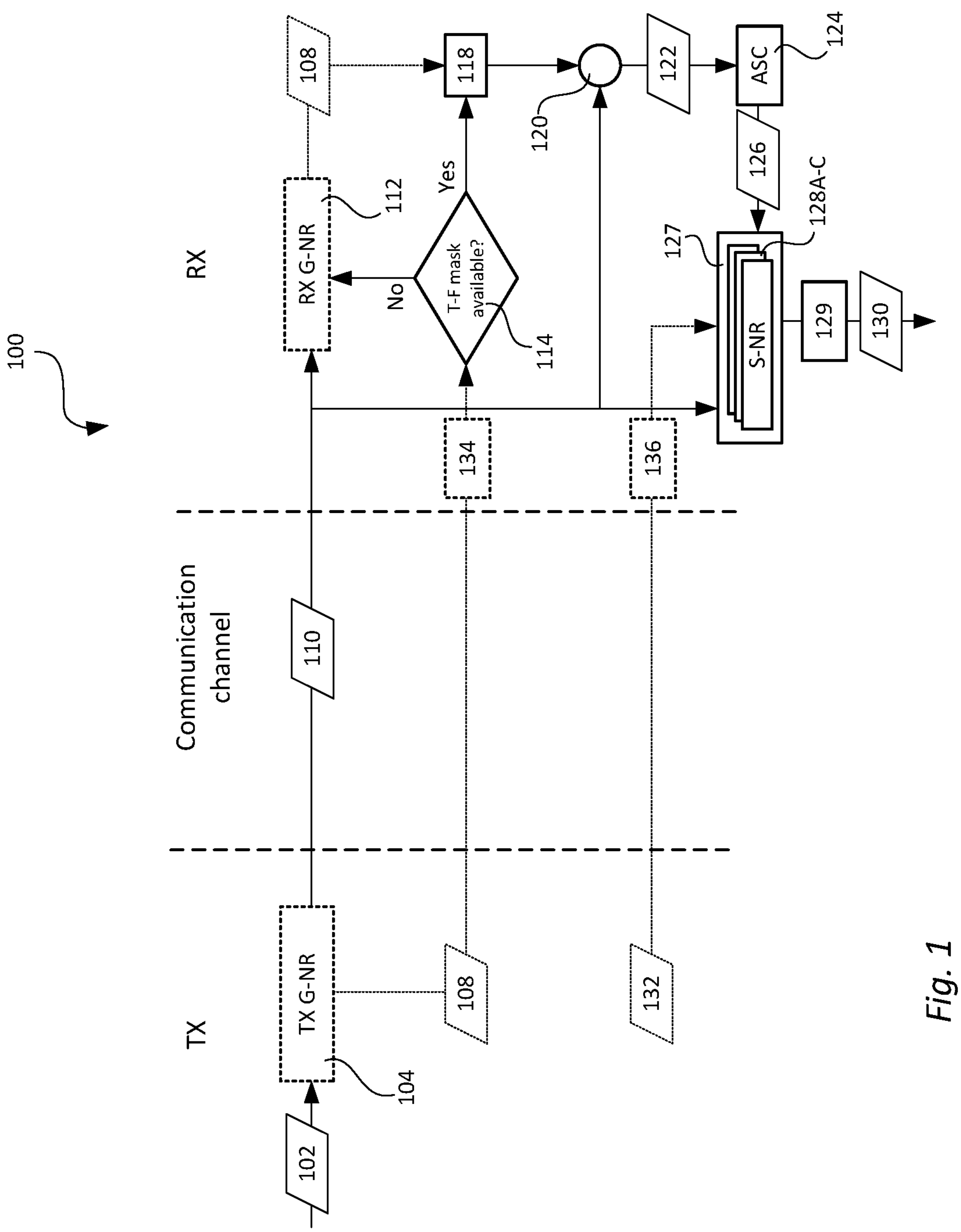
FIG. 1 schematically illustrates how audio input data can be processed into audio output data by a hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates by way of example a hearing device 100. As illustrated, the hearing device 100 may comprise a receiver RX device communicatively connected via a communication channel to a transmitter TX device. The hearing device 100 may be one piece of equipment in which both the transmitter device TX and the receiver device RX are integral parts, but it may also be a device with only the receiver device RX.

For instance, the hearing device may be a hearing aid comprising both a microphone and an output transducer. The microphone may in this example be linked to the TX device and the output transducer may be linked to the RX device. According to another example, the hearing device 100 may be a conference device provided with a loudspeaker. In this example, the conference device may comprise the RX device. The transmitter device TX in this example may be provided in a telephone or a computer of a user calling into the conference device.

The transmitter device TX can be configured to receive audio data 102. This audio data 102 may be captured by one or several microphones comprised in the transmitter device TX or from one or several external microphones. Once received, the audio data 102 may be fed to a transmitter-side generic noise reduction module (TX G-NR) 104 in which audio input data 110 and a time-frequency mask 108 are identified based on the audio data 102.

The TX G-NR 104 may comprise a neural network trained based on a large variety of different types of sounds. According to a specific example, the TX G-NR 102 can be set up in line with the teachings of the article "Single-Microphone Speech Enhancement and Separation Using Deep Learning" by M. Kolback (2018). The TX G-NR 102 can be embodied by using a feed-forward architecture with a 1845-dimensional input layer and three hidden layers, each with 1024 hidden units, and 64 output units (same number as gammatone filters). The activation functions for the hidden units can be Rectified Linear Units (ReLUs) and for the output units the sigmoid function can be applied. The network can target Ideal Ratio Masks (IRMs). As training data, the data provided by Microsoft™ as part of the DNS Challenge (see https://github.com/microsoft/DNS-Challenge) can be used. The IRM identified when assessing the data audio data 102 may be used as the T-F mask 108.

The audio input data 110 can be transferred via the communication channel from the TX device to the RX device. Even though not illustrated, before being transferred, the audio input data 110 may be encoded. The audio input data 110 can be transferred to a receiver-side generic noise reduction (RX G-NR) module 112 as well as to a specialized noise reduction (S-NR) selector 127, which will be described further down in detail.

In parallel with the audio input data 110, the T-F mask 108 can be transmitted from the TX device to the RX device. In the RX device, the T-F mask 108 can be received by a T-F mask receiver 134. The T-F mask receiver 134 can be communicatively connected to a T-F mask detector 114. In case the T-F mask detector 114 detects that the T-F mask 108 is transmitted from the TX device, this information can be made available to the RX G-NR module 112 and processing the audio input data 110 by the RX G-NR module 112 can be deemed not needed with the positive result that the computational power efficiency can be improved. On the other hand, in case it is detected that there is no T-F mask 108 transmitted from the TX device, the RX G-NR module 112 can be instructed to identify this by using the RX G-NR module 112. A benefit of this approach is that both TX devices configured to output the T-F mask 108 and not to output the T-F mask 108 can be used together with the RX device. Further, as indicated above, in case the T-F mask is determined by the TX device, computational power can be saved by detecting that the T-F mask is already identified.

Once the T-F mask 108 has been determined, either by the TX G-NR module 104 or the RX G-NR module 112, this is transferred to a speech removal module 120. Due to that the T-F mask 108 can be determined by two different modules, a switch 118 may be provided for assuring that the T-F mask 108 is transferred to the speech removal module 120 from one of the two modules.

In addition to the T-F mask 108, the audio input data 110 can also be transferred to the speech removal module 120. By multiplying, more specifically element-wise multiplying, the T-F mask 108 with the audio input data 110, or in any other way combining the two data sets, background sound data 122 can be achieved. Put differently, the T-F mask 108 is used not to remove noise from the audio input data 110, but to remove the speech components of the audio input data 110. The remaining noise, herein referred to as background sound data 122, is thereafter transferred to an Acoustic Scene Classifier (ASC) module 124.

Even though the example above is using the T-F mask 108 for providing the background sound data 122, this is only one of several options. In general, any side information extracted from the audio data 102, which can be used for distinguishing speech components from non-speech components, can be used.

Still an option, not illustrated in FIG. 1, is to use a neural network for determining the background sound data 122 without forming any side information, such as the T-F mask 108. If using the neural network for this purpose, the background sound data 122 may be determined based on the audio input data 110 provided from the transmitter device TX. In case a neural network is used as above, the audio data 102 received by the transmitter device TX may be forwarded without being modified, i.e. the audio input data 110 may correspond to the audio data 102.

The ASC module 124 may link the background sound data 122 to one of a number of acoustic scenes. By way of example, the background sound data 122 may be linked to three pre-determined acoustic scenes associated to a transportation environment, an indoor environment and an outdoor environment. However, it is also possible to implement the ASC module 124 such that this outputs combinations of pre-determined acoustic scenes.

The ASC module 124 may be implemented in a number of different ways. One option is to use a deep convolutional layer network as the ASC module 124. An advantage of this is that such network can efficiently extract hidden features from input log-mel spectrograms. Using the convolutional layer network, sometimes also referred to as convolutional neural network (CNN), allows for the advantage that less number of parameters may be needed compared to other types of networks. This in turn results in hardware advantages. This holds true in particular for deep CNNs. An example of a network that has proven beneficial to use for acoustic scene classification is further described in the article "PANNs: Large-Scale Pretrained Audio Neural Networks for Audio Pattern Recognition" (2019) by Q. Kong, Y. Cao, T. Iqbal, Y. Wang and M. Plumbley. The network can be first trained by using the AudioSet provided by Google™ (see link https://research.google.com/audioset/). This data set comprises 2.1 million clips from YouTube (5800 hours, 1.5+TB, 527 classes). For fine-tuning the training, it has found beneficial to use the dataset provided in the article "A multi-device dataset for urban acoustic scene classification," in Workshop on Detection and Classification of Acoustic Scenes and Events (DCASE), 2018, pp. 9-13, by A. Mesaros, T. Heittola, and T. Virtanen (40 hours, 30 sec audio files, 12 European cities, two channels, recordings at 48 Hz, 41.5

GB, 10 labels: airport, shopping mall, metro station, street pedestrian, public square, street traffic, tram, bus, metro, park). Put differently, by choosing the dataset above, or similar, as training data set, the CNN will be adapted for the task of environment classification, i.e. the CNN is becoming adapted to this specific sound classification and not sound classification in general.

The ASC module may be trained on pure environmental background noise, i.e. no speech present. However, it is also possible to train this by also take into account audio data comprising environmental background noise and speech as well as environmental background noise with speech removed. The latter type of data may be achieved by using the TX G-NR module 104 or the RX G-NR module 112 for removing the speech. It is also possible to train the ASC module by using a combination of all three of the above as well as a combination of two of them.

Once having linked the background sound data 122 to an acoustic scene, acoustic scene data 126, comprising information about the acoustic scene identified, can be transferred from the ASC module 124 to a specialized noise-reduction (S-NR) selector 127. Based on the acoustic scene data 126, a S-NR module 128A-C can be chosen among a number of different S-NR modules 128A-C, linked to different acoustic scenes.

The S-NR modules 128A-C may have the same neural network architecture as the G-NR modules, i.e. the TX G-NR module 104 and the RX G-NR module 112, but they may also have a more complex structure. The more complex structure may be achieved by having the architecture based on multi-recurrent layers, such as LS™ (long short-term memory) and GRU (gated recurrent unit) layers.

The S-NR modules 128A-C may also be trained by using the data provided by Microsoft™ as part of the DNS Challenge (see https://github.com/microsoft/DNS-Challenge). In addition, in particular for environments that are likely to include speech, data sets comprising audio input data may also be considered. For instance, the Voice Cloning Toolkit (VCTK) can form part of the training data as well.

Once the S-NR module 128A-C matching the acoustic scene data 126 has been selected, the audio input data 110 can be processed by using this S-NR module 128A-C in a processing module 129 such that audio output data 130 is generated. A difference between the audio output data 130 and the audio input data 110 is that the speech intelligibility is improved.

In case the TX device forms part of a mobile phone carried by a user, position data 132 connected to the TX device may be used as additional input for selecting S-NR module 128A-C. For instance, in case the position data indicates that the user is moving at a speed of 50-100 km per hour and in case the ASC module 124 indicates about the same likelihood that the acoustic scene is the indoor environment and the transport environment, the position data 132 may, when being taken into account, result in that the transport environment is selected. The position data 132 may be received by a position data receiver 136 in the RX device. As an alternative to being fed to the S-NR selector 127, the position data 132 may be provided to the ASC module 124 and in this way form part of the identification process of the acoustic scene.

Even though not illustrated, information about the acoustic scene identified may be provided to the user. For instance, it may be presented information in a graphical user interface (GUI) regarding which acoustic scene that is being used, e.g. a message saying "train audio settings are being employed" can be presented in a software application in the user's mobile phone. In case the acoustic scene classification is not made correct, the user may have the option to override the selection made by the ASC module 124 and make a manual selection. Still a possibility is to actively pose a question to the user when the acoustic scene classification cannot be made reliable, i.e. when the background sound data 122 is not directly matching any of the pre-set environments.

Figure 2:
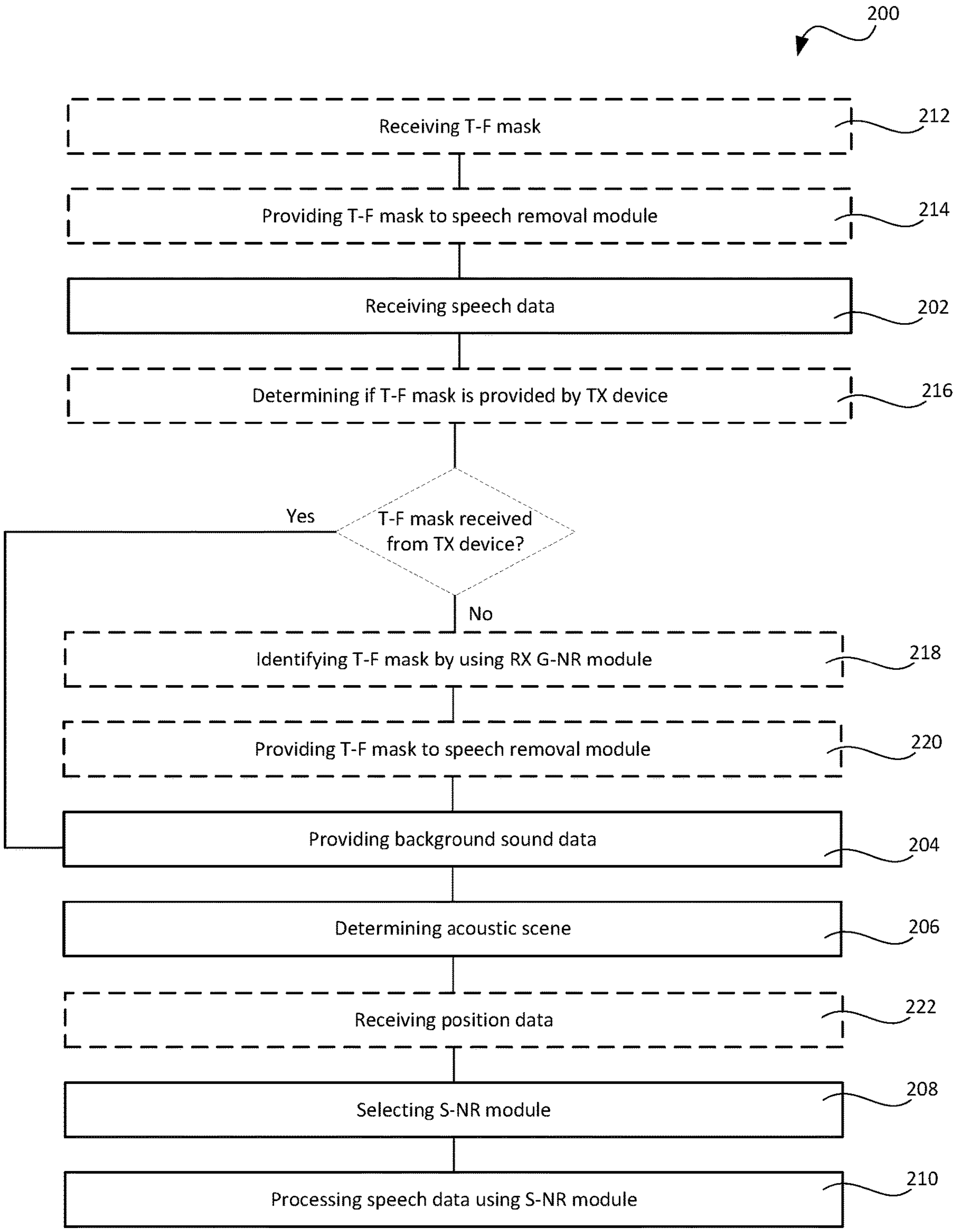
FIG. 2 is a flow chart illustrating a method for transforming audio input data into audio output data.

FIG. 2 is a flowchart illustrating steps of a method 200 for transforming audio input data into audio output data, that is, how audio data can be processed such that speech intelligibility is improved.

In a first step 202, the audio input data 110 can be received. Once received, the background sound data 122, sometimes referred to as noise and sometimes referred to as environmental sound data, can in a second step 204 be provided by separating speech components from the audio input data 110. Thereafter, in a third step 206, the acoustic scene data 126 can be determined. Based on the acoustic scene data 126, in a fourth step 208, the S-NR module 128A-C can be selected. Thereafter, in a fifth step 210, the speech enhanced data 130 can be generated by using the S-NR module 128A-C.

Optionally, in a sixth step 212, the T-F mask 108, or other side information, may be received by the RX device. After being received, in a seventh step 214, the T-F mask 108 can be provided to the speech removal module 120 such that the background sound data 122 is generated by combining the audio input data 110 and the T-F mask 108.

Optionally, in an eighth step 216, it can be determined if the T-F mask 108 is received from the TX device. In case the T-F mask 108 is received, the RX G-NR module 112 can be deactivated, i.e. not being used for identifying the T-F mask 108. On the other hand, in case the T-F mask is not received by the RX device, the RX G-NR module 112 can be activated and the T-F mask can be provided by the RX G-NR module 112 in a ninth step 218.

As explained above, the ninth step 218 can be performed in case it is determined that there is no T-F mask 108 provided by the TX device. As alternative, in case the TX device is not provided with the functionality of determining the T-F mask 108, the RX G-NR module can be set to perform the ninth step 218 without performing the eighth step 216. Once having performed the ninth step 218, in a tenth step 220, the T-F mask 108 is provided to the speech removal module such that the background sound data 122 is generated.

Further, in an eleventh step 222, the position data 132 can be received, and once received this data can be used as input to the decision process for selecting the S-NR module 128A-C.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

100—hearing device
102—audio data
104—transmitter-side general noise reduction (TX G-NR) module
108—time-frequency (T-F) mask

110—audio input data

112—receiver-side general noise reduction (RX G-NR) module

114—T-F mask selector

118—switch

120—speech removal module

122—background sound data

124—ASC module

126—acoustic scene data

127—specialized noise reduction (S-NR) selector

128A-C—specialized noise reduction (S-NR) modules

129—processing module

130—speech enhanchment data

132—position data

134—T-F mask receiver

136—position data receiver

200-220—method for transforming audio input data into audio output data and the different steps associated to this method

The invention claimed is:

1. A method for transforming audio input data into audio output data, the method performed by a receiver device wherein a receiver G-NR module and a Time-Frequency (T-F) mask detector are arranged in the receiver device, the method comprising:

receiving audio input data;

providing background sound data by separating speech components from the audio input data by using a speech removal module;

determining acoustic scene data, linked to an acoustic scene matching the background sound data, by using an acoustic scene classifier module;

selecting a specialized noise reduction (S-NR) module based on the acoustic scene data;

generating the audio output data by processing the audio input data using the specialized noise reduction module, wherein the speech removal module is configured to generate the background sound data by combining the audio input data with a time-frequency mask;

determining if the T-F mask is received from a transmitter device, and either deactivate the receiver G-NR module when the T-F mask is received by the receiver device, or activate the receiver G-NR module when the T-F mask is not received by the receiver device such that the T-F mask is provided by the receiver G-NR module.

2. The method according to claim 1, wherein the specialized noise reduction module is selected among a fixed set of pre-trained neural networks, each addressing a sound environment with specific characteristics.

3. The method according to claim 2, wherein the fixed set of pre-trained neural networks comprises:

at least three modules, wherein each of the at least three modules comprises:

one module addressing a transportation environment, one module addressing an outdoor environment and one module addressing an indoor environment.

4. The method according to claim 1, wherein the audio input data is received by the receiver device from the transmitter device, wherein the method further comprises:

receiving, at the receiver device, a Time-Frequency (T-F) mask from the transmitter device, and providing the T-F mask to the speech removal module arranged in the receiver device such that background sound data is generated by combining the audio input data with the T-F mask.

5. The method according to claim 4, wherein the providing of the background sound data is performed by multiplying the audio input data with the T-F mask.

6. The method according to claim 4, wherein the audio input data and the T-F mask are received in parallel by the receiver device.

7. The method according to claim 4, wherein the S-NR module is more complex than a receiver side generic noise reduction module, configured to identify the T-F mask based on the audio input data, such that computational power associated with the S-NR module is greater than computational power associated with the RX G-NR module.

8. The method according to claim 1, the method further comprising:

identifying the T-F mask by using the receiver G-NR module on the audio input data, and providing the T-F mask to the speech removal module such that background sound data is generated by combining the audio input data with the T-F mask.

9. The method according to claim 1, further comprising:

receiving position data, wherein the selecting of the S-NR module is based on the acoustic scene data in combination with the position data.

10. A hearing device, comprising:

a processing device, comprising:

a receiver device arranged to receive audio input data from a transmitter device, the receiver device comprising:

a speech removal module configured to provide background sound data by separating speech components from the audio input data, an acoustic scene classifier module configured to determine acoustic scene data, linked to an acoustic scene matching the background sound data, a specialized noise reduction selector configured to select a specialized noise reduction module based on the acoustic scene data, an output data generating module configured to process the audio input data by using the specialized noise reduction module such that audio output data is generated, wherein the speech removal module is configured to generate the background sound data by combining the audio input data with a time-frequency (T-F) mask;

a receiver generic noise reduction module configured to provide the T-F mask based on the audio input data, and a T-F mask detector configured to:

identify whether or not the T-F mask is transmitted from the transmitter device, and either of:

deactivate the receiver G-NR module when the T-F mask is transmitted from the transmitter device, or activate the RX G-NR module when the T-F mask is not transmitted by the transmitter device such that the T-F mask is provided by the RX G-NR module.

11. The hearing device according to claim 10, wherein the receiver device further comprises:

a T-F mask receiver configured to receive the T-F mask from the transmitter device, wherein the speech removal module is further configured to remove the speech components from the audio input data by combining the audio input data and the T-F mask.

12. The hearing device according to claim 10, wherein the receiver device further comprises:

a receiver generic noise reduction module configured to:

provide the T-F mask based on the audio input data, and provide the T-F mask to the speech removal module such that background sound data is generated by combining the audio input data with the T-F mask.

13. The hearing device according to claim 10, wherein the receiver device further comprises:

a position data receiver configured to receive position data from the transmitter device, wherein the S-NR selector is configured to select the S-NR module based on the acoustic scene data in combination with the position data.

* * * * *